(12) United States Patent
Hatsuda et al.

(10) Patent No.: US 6,207,772 B1
(45) Date of Patent: Mar. 27, 2001

(54) METHOD FOR PRODUCTION OF CROSS-LINKED POLYMER

(75) Inventors: Takumi Hatsuda; Toru Yanase; Yasuhiro Fujita; Kazuki Kimura, all of Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/620,902

(22) Filed: Jul. 20, 2000

Related U.S. Application Data

(62) Division of application No. 08/867,780, filed on Jun. 3, 1997.

(30) Foreign Application Priority Data

Jun. 5, 1996 (JP) .................................................. 8-142708

(51) Int. Cl.⁷ .............................. C08F 20/06; C08F 20/04
(52) U.S. Cl. ........................ 526/88; 526/240; 526/317.1; 526/318.3; 526/320; 526/335
(58) Field of Search ................................. 526/88, 317.1, 526/318.3, 335, 240, 320

(56) References Cited

U.S. PATENT DOCUMENTS

| | | | |
|---|---|---|---|
| 4,286,082 | 8/1981 | Tsubakimoto et al. | 526/240 |
| 4,625,001 | 11/1986 | Tsubakimoto et al. | 526/88 |
| 4,654,039 | 3/1987 | Brandt et al. | 604/368 |
| 4,914,170 | * 4/1990 | Chang | 526/240 |
| 4,973,632 | 11/1990 | Nagasuna et al. | |
| 4,985,514 | 1/1991 | Kimura et al. | 526/88 |
| 5,147,343 | 9/1992 | Kellenberger . | |
| 5,380,808 | 1/1995 | Sumiya et al. | 526/317.1 |
| 5,672,633 | 9/1997 | Brehm et al. . | |
| 5,797,893 | 8/1998 | Wada et al. . | |
| 5,981,070 | 11/1999 | Ishizaki et al. . | |

FOREIGN PATENT DOCUMENTS

| | | |
|---|---|---|
| 0 508 810 A2 | 10/1992 | (EP) . |
| 0 467 073 A1 | 4/1995 | (EP) . |
| 0 467 073 B1 | 4/1995 | (EP) . |
| 56-91837 | 7/1981 | (JP) . |
| 1-144404 | 6/1989 | (JP) . |
| 2-19122 | 4/1990 | (JP) . |
| 4-175319 | 6/1992 | (JP) . |
| 8-337726 | 12/1996 | (JP) . |

OTHER PUBLICATIONS

Polymeric New Material One Point–4 "High Absorbent Polymer", Ed: The Society of Polymer Science, Japan, By: Fusayoshi Masuda, Publ. Nov. 15, 1987. (Japanese text with partial English translation.)

Partial Translation JP–A–08–337726.

* cited by examiner

*Primary Examiner*—Fred Zitomer
(74) *Attorney, Agent, or Firm*—Burns, Doane, Swecker & Mathis, LLP

(57) ABSTRACT

A method for producing a cross-linked polymer manifesting a high absorption capacity and having a small content of soluble component by a convenient and expeditious process with high productivity is provided. An absorbent resin such that disposable diapers and other products incorporating the absorbent resin manifest outstanding qualities and a method for the production of the absorbent resin are proposed. The cross-linked polymer according to this invention is produced by a method of polymerizing an aqueous polymerizable monomer solution containing a water-soluble ethylenically unsaturated monomer and a first cross-linking agent capable of forming a hydrogel polymer by polymerization, which method comprises the steps of performing the polymerization in a substantially static state from the time at which the polymerization is initiated till the time at which the whole polymerization system is gelated, subsequently giving the polymerization system a thorough shearing force thereby granulating the hydrogel polymer before the polymerization system has the temperature thereof elevated by the heat of polymerization to the highest level, and further continuing the polymerization.

17 Claims, 1 Drawing Sheet

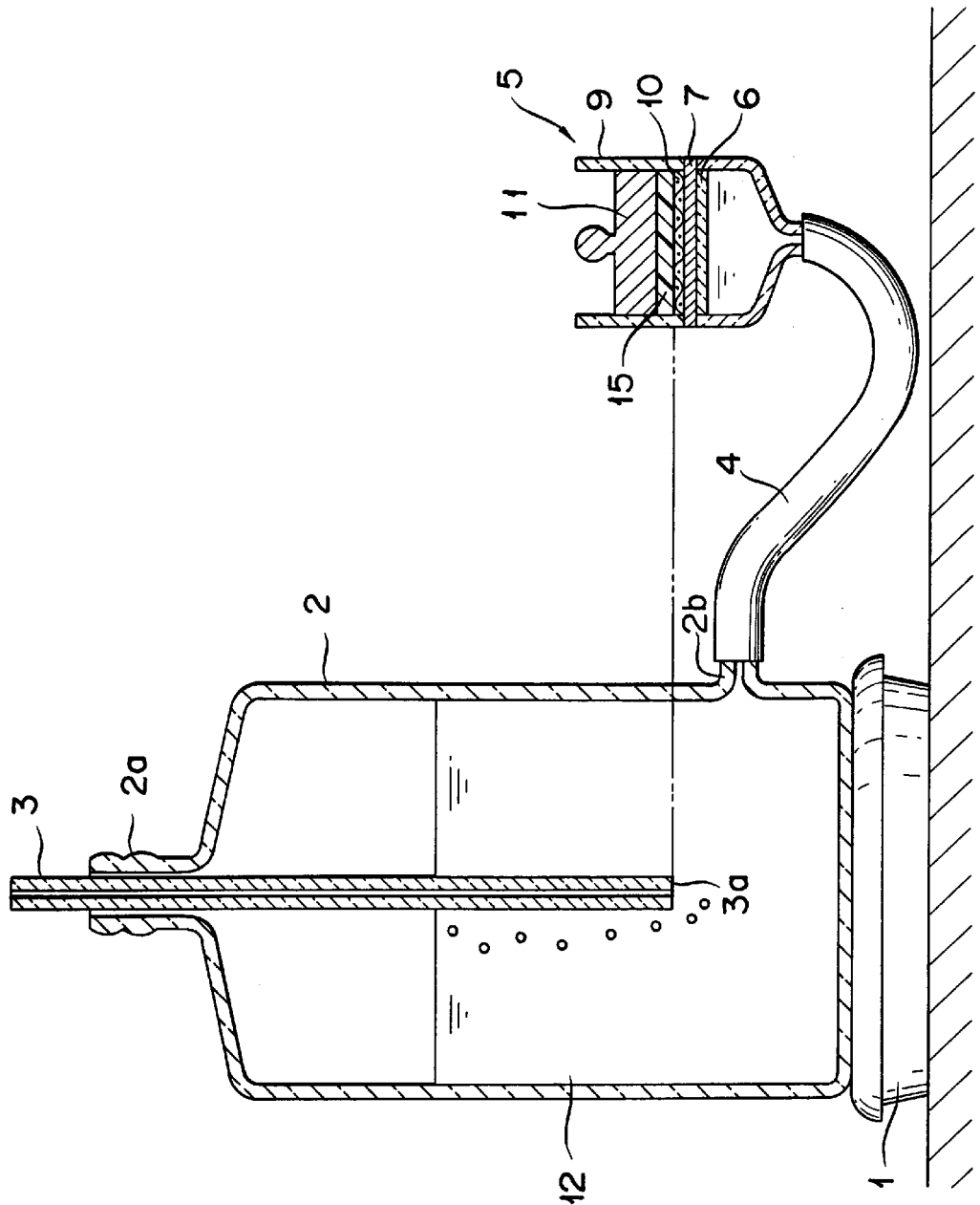

METHOD FOR PRODUCTION OF CROSS-LINKED POLYMER

This application is a divisional application of U.S. patent application Ser. No. 08/867,780, filed Jun. 3, 1997.

BACKGROUND OF THE INVENTION

1. Field of the Invention

This invention relates to a method for the production of a cross-linked polymer. More particular, it relates to a method for the production of a cross-linked polymer for the formation of an absorbent resin. It further relates to an absorbent resin manifesting large absorption capacity without load and under load, suffering only a small deteriorated soluble component, and exhibiting excellent qualities when used as sanitary materials and a method for the production thereof.

2. Description of the Prior Art

In recent years, absorbent resins have been developed as polymers capable of gelating with a large amount of absorbed water and have been finding extensive utility in a wide range of applications as a sanitary absorbent agent for sanitary napkins and disposable diapers and as a water-retaining agent and a dewatering agent in the field of agriculture and horticulture and the field of civil engineering and construction industry.

As cross-linked polymers available for the formation of absorbent resins, partially neutralized cross-linked polyacrylic acid, modified cross-linked polyvinyl alcohol, cross-linked isobutylene-maleic anhydride copolymer, cross-linked polyethylene oxide, saponified acrylic ester-vinyl acetate copolymer, hydrolyzed starch-acrylonitrile graft polymer, and starch-acrylic acid graft polymer have been known.

As means for the production of these cross-linked polymers, such methods of reversed-phase suspension polymerization as disclosed in JP-A-56-161,408, JP-A-57-94,011, JP-A-57-158,209, and JP-A-57-198,714 and such methods of aqueous solution polymerization as disclosed in JP-B-02-19,122, JP-B-48-42,466, JP-A-58-49,714, JP-B-59-37,003, U.S. Pat. No. 4,286,082, and U.S. Pat. No. 4,625,001 have been known.

The methods of reversed-phase suspension polymerization, on account of inevitable use of an organic solvent, possibly harm the work environment and induce ignition and explosion, demand due measures, and prove costly because of the expense of the organic solvent and the expense required for the removal thereof. Since the organic solvent remains in a minute amount in the product, thorough removal of this residue forms an addition to the cost. Further, the cross-linked polymers which are obtained by the methods of the reversed-phase suspension polymerization have spherical shapes and small diameters. When they are used as for disposable diapers, therefore, they hardly remain fast on fibrous absorbent core components made of pulp and tend to fall off the core components and, therefore, allow no convenient handling.

By contrast, the methods of aqueous solution polymerization have none of the problems mentioned above. Specifically, the methods disclosed in JP-B-02-19, 122, U.S. Pat. No. 4,625,001, etc. have been known, for example. The method disclosed in the patent publications mentioned above purports to produce a cross-linked polymer by subjecting the aqueous solution of a monomer destined to form a cross-linked structure and turn into a hydrogel polymer during the aqueous solution polymerization and a polymerization initiator to radical aqueous solution polymerization in a vessel provided with a rotary stirring shaft and carrying out this radical aqueous solution polymerization while finely dividing the hydrogel polymer formed in consequence of the advance of polymerization with the shearing force generated by the rotation of rotary arms or stirring vanes provided on the stirring shaft. These methods of production not only excel extremely in workability but also feature the ability to manufacture a finely divided hydrogel polymer possessed of a cross-linked structure in the molecule thereof with high productivity. Satisfactory conditions which enable these methods to produce a cross-linked polymer having a relatively large absorption capacity and an amply small content of soluble component have never been known. An attempt to obtain a cross-linked polymer having an amply small content of soluble component has resulted in a conspicuous decrease in productivity and an increase in the amount of residual monomer.

It is well known to persons of ordinary skill in the art that a decrease in the density of cross-links adds to the absorption capacity and, at the same time, increases the content of soluble component. The soluble component in the cross-linked polymer is such that, when the cross-linked polymer forms hydrogel on contact with such liquid as water, urine, or body fluid to be absorbed, it is exuded from the hydrogel. The soluble component which is extracted by the liquid being absorbed not only lowers the cross-linked polymer's absorption capacity but also aggravates the deterioration of the cross-linked polymer. Further, the ropiness of the soluble component brings about such unfavorable situations as emitting offensive feeling or polluting the liquid being absorbed.

The development of a method for producing a cross-linked polymer having a high absorption capacity and a small content of soluble component, therefore, has been longed for.

U.S. Pat. No. 4,654,039 and U.S. Pat. No. 4,985,514 have proposed methods for producing a cross-linked polymer having a high absorption capacity and a small content of soluble component by aqueous solution polymerizing a free acid type monomer or a monomer of a specific neutralizing ratio. These methods of production, however, suffer from inferior productivity because they produce an residual monomer in a large amount, necessitate neutralization as a subsequent step, or complicate the procedure.

U.S. Pat. No. 4,286,082 and U.S. Pat. No. 5,380,808 disclose methods for the production of a cross-linked polymer having a high absorption capacity and a small content of soluble component and a small amount of residual monomer by polymerizing the aqueous solution of a monomer while controlling a temperature of the polymerization system without stirring this aqueous solution. The fact that the step of polymerization is carried out without the action of stirring inevitably imposes a limit on the polymerization device to be used in performing the polymerization on a commercial scale. Then, the fact that the polymerization is performed while the temperature of the polymerization system is controlled in a prescribed range entails such problems as lowering productivity and adding conspicuously to the size of the polymerizing device.

The method which, by a convenient and expeditious process, produces a cross-linked polymer having a high absorption capacity and a small content of soluble component with high operational efficiency has not yet been established.

An object of this invention, therefore, is to provide a method of production which enables a cross-linked polymer having a high absorption capacity and a small content of soluble component to be produced with high operational efficiency.

As the characteristic properties which the cross-linked polymer is expected to possess as an absorbent resin, the high absorption capacity, the small content of soluble component, and the high absorption capacity under load may be cited. While the characteristic properties of the absorbent resin are stably retained for a long time when the absorbent resin is swelled with purified water or physiological saline solution, they are deteriorated with the elapse of time owing to an increase in the content of soluble component, a decrease in the absorption capacity without load and under load, and generation of conspicuously offensive feeling of ropiness when the absorbent resin is swelled with urine. Thus, the cross-linked polymer poses problems when it is used for such sanitary materials as disposable diapers.

Another object of this invention, therefore, is to provide an absorbent resin such that disposable diapers and other products which incorporate the absorbent resin manifest excellent qualities under the conditions of actual use.

SUMMARY OF THE INVENTION

The objects mentioned above are accomplished by the following items (1)–(18).

(1) A method for the production of a cross-linked polymer by the polymerization of an aqueous polymerizable monomer solution containing a water-soluble ethylenically unsaturated monomer and a first cross-linking agent capable of forming a hydrogel polymer by polymerization, which comprises performing the polymerization in a substantially static state from the time at which the polymerization is initiated till the time at which the whole polymerization system is gelated, subsequently giving the polymerization system a thorough shearing force thereby pulverizing the hydrogel polymer before the polymerization system has a temperature thereof elevated by the heat of polymerization to the highest level, and further continuing the polymerization.

(2) A method according to (1) above, wherein the polymerization of an aqueous polymerizable monomer solution containing a water-soluble ethylenically unsaturated monomer and a first cross-linking agent capable of forming a hydrogel polymer by polymerization is carried out by performing the heat-removing polymerization in a substantially static state from the time at which the polymerization is initiated till the time at which the whole polymerization system is gelated, subsequently giving the polymerization system a thorough shearing force thereby pulverizing the hydrogel polymer before the polymerization system has a temperature thereof elevated by the heat of polymerization to the highest level, and further continuing the heat-removing polymerization.

(3) A method according to (1) or (2) above, wherein the polymerization of an aqueous polymerizable monomer solution containing a water-soluble ethylenically unsaturated monomer and a first cross-linking agent capable of forming a hydrogel polymer by polymerization is carried out performing the heat-removing polymerization in a substantially static state from the time at which the polymerization is initiated till the time at which the whole polymerization system is gelated in a reaction vessel provided with a rotary arm or a stirring vane, subsequently giving the polymerization system a thorough shearing force by the rotary arm or stirring vane thereby pulverizing the hydrogel polymer before the polymerization system has a temperature thereof elevated by the heat of polymerization to the highest level, and further continuing the heat-removing polymerization.

(4) A method according to any of (1) to (3) above, wherein the polymerization is carried out in the substantially static state until the temperature of the polymerization system reaches at least 40° C.

(5) A method according to any of (1)–(4) above, wherein the formed hydrogel polymer is briefly ruptured between the time at which the polymerization is initiated and the time at which the whole polymerization system is gelated.

(6) A method according to (5) above, wherein the formed hydrogel polymer is briefly ruptured by the rotation of a rotary arm or a stirring vane between the time at which the polymerization is initiated and the time at which the whole polymerization system is gelated.

(7) A method according to any of (1)–(6) above, wherein the polymerization is carried out in the substantially static state until the temperature of the polymerization system elevated by the heat of polymerization reaches at least 50° C.

(8) A method according to (4) or (7) above, wherein the duration of the static state is at least 60 seconds.

(9) A method according to any of (1)–(8) above, wherein the hydrogel polymer has a size of less than 150 mm when the maximum temperature is reached.

(10) A method according to any of (1)–(9) above, wherein the polymerization system is retained at a temperature in the range of 50°–85° C. for at least 5 minutes after the polymerization system has reached the maximum temperature.

(11) A method according to any of (1)–(10) above, wherein the aqueous polymerizing monomer solution has acrylic acid and/or an alkali metal salt, an ammonium salt, or an amine salt thereof, and a first cross-linking agent possessed of at least two polymerizing unsaturated double bonds per molecule as main components thereof.

(12) A method according to (11) above, wherein the concentration of the water-soluble ethylenically unsaturated monomer in the aqueous polymerizable monomer solution is in the range of 10–80% by weight.

(13) A method according to (12) above, wherein the amount of the first cross-linking agent is in the range of 0.001–20% by weight, based on the amount of the water-soluble ethylenically unsaturated monomer.

(14) A method for the production of an absorbent resin, which comprises drying and pulverizing the cross-linked polymer obtained by the method of production set forth in any of (1)–(13) thereby producing cross-linked polymer particles, mixing the cross-linked polymer particles with a second cross-linking agent capable of reacting with at least two functional groups in the proximity of the surface of the cross-linked polymer particles, and subjecting the resultant mixture to a heat treatment.

(15) A method according to (14) above, wherein the amount of the second cross-linking agent is in the range of 0.001–10% by weight, based on the amount of the solids of the cross-linked polymer.

(16) A method according to (15) above, wherein water or a hydrophilic organic solvent is used as a solvent during the mixture of the cross-linked polymer with the second cross-linking agent.

(17) A method according to (14) above, wherein the heat treatment is carried out at a temperature in the range of 50°–250° C.

(18) An absorbent resin manifesting an absorption capacity with physiological saline solution without load of at least 30 g/g, an absorption capacity with physiological saline solution under load of at least 25 g/g, and a content of deteriorated soluble component of not more than 15% by weight and assuming an irregular shape.

The expression "heat-removing polymerization" as used in the present invention means the polymerization under controlling the temperature of the polymerization system to an optimum temperature by external cooling, concretely recycling cooling water into a jacket, and it is the polymerization method which can give good properties compared to those of adiabatic polymerization which has no concept for positively removing the heat of the polymerization system. For example, a temperature of the cooling water is controlled to the same or below of the polymerization initiated temperature during from polymerization initiation to reaching a maximum temperature. More preferably, the temperature of the cooling water is maintained to the same or below of the polymerization initiation temperature. Further, the polymerization vessel has preferably a lager heat transfer area in order to cool by the jacket.

The term "polymerization system" as used in this invention refers to an aqueous polymerizable monomer solution and/or a hydrogel polymer. The time at which the polymerization is initiated is known from the increase of the viscosity of the polymerization system, the opacification of the polymerization system, or the elevation of the temperature of the polymerization system. The expression "the time at which the polymerization system is wholly gelated" refers to the time at which the polymerization system ceases to flow when the reaction vessel is tilted or the time at which the polymerization system begins to retain a prescribed shape.

The expression "the polymerization is performed in the substantially static state" as used in the present invention does not refer solely to the fact that the polymerization is performed while keeping the rotary arms or stirring vanes at a stopped state. The following methods are embraced in the meaning of the polymerization which is to be performed in a substantially static state.

(a) A method of performing the polymerization by a rotation at a low speed of about 5 rpm, preferably 0 rpm.

(b) A method of performing the polymerization by combining total absence of rotation with a rotation at a low speed of about 5 rpm, preferably 0 rpm.

(c) A method of (a) plus a method of performing the polymerization by a brief rotation such as to impart a shearing force enough to rupture the gel.

(d) A method of (b) plus a method of performing the polymerization by a brief rotation such as to impart a shearing force enough to rupture the gel.

(e) A method of performing the polymerization by combining total absence of rotation with a brief rotation such as to impart a shearing force enough to rupture the gel.

It should be noted, however, that this invention is not limited to the methods of (a)–(e) mentioned above.

The expression "the absorption capacity without load" as used in this invention refers to the absorption capacity of a given absorbent resin with physiological saline solution to be determined under the condition of applying no pressure to the absorbent resin. The method for determining the absorption capacity without load will be described in detail in a working example to be cited herein below.

The expression "the absorption capacity under load" as used in this invention refers to the absorption capacity of a given absorbent resin with physiological saline solution to be determined under the condition of applying a prescribed load to the absorbent resin. The method for determining the absorption capacity under load will be described in detail in a working example to be cited herein below.

The term "the content of deteriorated soluble component" as used in this invention refers to the amount of a water-soluble component determined by a procedure which comprises preparing a hydrogel having a given absorbent resin swelled to a prescribed ratio with a prescribed amount of synthetic urine and allowing the hydrogel to stand under prescribed conditions for a prescribed time. The absorbent resin after absorbing the artificial urine succumbs to deterioration and, at the same time, suffers growth of a content of soluble component with the elapse of time. If the increase in the content of soluble component is large, it will bring about particularly adverse effects on an absorbent for sanitary materials as by lowering the absorption capacity of the absorbent resin without load and under load and aggravating the ropiness of the swelled absorbent resin even to the extent of producing a conspicuously offensive feeling. The absorbent resin to be used in disposable diapers, therefore, prefers to have the lowest possible content of deteriorated soluble component because the stability of the gel to withstand urine increases and the duration of the retention of excellent properties of the absorbent resin elongates in accordance as the content of soluble component decreases. The term "synthetic urine" as used herein means an aqueous solution having urea, sodium chloride, magnesium sulfate, calcium chloride, and L-ascorbic acid dissolved therein in amounts calculated to equal substantially the contents thereof in actual urine. The method for the determination of the content of deteriorated soluble component will be described in detail in a working example to be cited herein below.

The cross-linked polymer to be obtained by this invention has such excellent features as a large absorption capacity and a small content of soluble component as compared with the conventional cross-linked polymer. Further, the irregular absorbent resin which is obtained by drying and pulverizing the cross-linked polymer mentioned above thereby forming cross-linked polymer particles, mixing the cross-linked polymer particles with a second cross-linking agent capable of reacting at least two functional groups in the proximity of the surface of the cross-linked polymer particles, and heat-treating the resultant mixture is possessed of the heretofore unattainable features such as an absorption capacity of physiological saline solution without load of at least 30 g/g, an absorption capacity of physiological saline solution under load of at least 25 g/g, and a content of deteriorated soluble component of not more than 15% by weight. Thus, the absorbent resin of this invention can be optimally used for such sanitary materials as disposable diapers and sanitary napkins.

BRIEF DESCRIPTION OF THE DRAWING

FIG. 1 is a schematic cross section of an apparatus to be used for the determination of an absorption capacity under load which is used in the present invention.

DESCRIPTION OF THE PREFERRED EMBODIMENT

Now, this invention will be described more specifically below.

The water-soluble ethylenically unsaturated monomer to be used in this invention has no particular restriction except the requirement that it be an ethylenically unsaturated monomer which is soluble in water. This monomer may be used in combination with a hydrophobic monomer within a range not departing from the objects of this invention. As typical examples of the water-soluble ethylenically unsaturated monomer, anionic monomers such as (meth)acrylic acid, (anhydrous) maleic acid, fumaric acid, crotonic acid, itaconic acid, 2-(meth)acryloyl ethane sulfonic acid, 2-(meth) acryloyl propane sulfonic acid, 2-(meth)acrylamide-2-methyl propane sulfonic acid, vinyl sulfonic acid, and styrene sulfonic acid and salts thereof; nonionic hydrophilic group-containing monomers such as (meth)acrylamide, N-substituted (meth)acrylamide, 2-hydroxyethyl (meth) acrylate, 2-hydroxypropyl (meth) acrylate, methoxy polyethylene glycol (meth) acrylate, and polyethylene glycol (meth)acrylate; and amino group-containing unsaturated monomers such as N,N-dimethylaminoethyl(meth)acrylate, N,N-dimethylaminopropyl (meth)acrylate, and N,N-dimethylaminopropyl (meth) acrylamide and the products of quaternization thereof may be cited. Such a hydrophobic monomer as, for example, an acrylic ester like methyl (meth)acrylate, ethyl (meth)acrylate, or butyl (meth) acrylate, vinyl acetate, or vinyl propionate may be additionally used in an amount incapable of heavily harming the hydrophilicity of the polymer to be obtained.

The monomer which proves advantageous from the viewpoint of the quality of the produced cross-linked polymer and the cost is an anionic monomer. It is particularly advantageous to use acrylic acid and/or an alkali metal salt, an ammonium salt, or an amine salt thereof as main components because the cross-linked polymer to be consequently obtained excels in absorption properties. At this time, the content of the acrylic acid and/or the alkali metal salt, ammonium salt, or amine salt thereof is properly not less than 50% by weight, preferably not less than 75% by weight, based on the total amount of the water-soluble ethylenically unsaturated monomer. When such an acid group-containing monomer as (meth) acrylic acid is used as a main component and the ratio of neutralization of this acid group is less than 50 mol %, it is proper to mix the polymerization system either during or after the polymerization (after the temperature of the polymerization system has reached the highest level, for example) with a hydroxide or an alkaline substance such as an alkali metal salt, an ammonium salt, or an amine salt so as to adjust the ratio of neutralization of the acid radical to a level in the range of 50–90 mol %, preferably 55–80 mol %.

The first cross-linking agent to be used in this invention is intended to form a cross-linked structure during the process of polymerization. As typical examples of the cross-linking agent which answers this description, compounds having at least two polymerizable unsaturated double bonds in the molecular unit thereof, compounds having at least two groups capable of reacting with a functional group such as acid group, hydroxyl groups, amino group, etc. in the molecule which is possessed by the water—soluble ethylenically unsaturated monomer, compounds having at least one double bond and at least one group capable of reacting with the functional group of the monomer, compounds having at least two points capable of reacting with the functional group of monomer within the molecular unit, and hydrophilic polymers capable of forming a cross-linked structure as by graft bondage during the process of polymerization of the monomer component may be cited.

As typical examples of the first cross-linking agent, polyvalent(meth)acrylamide compounds such as N,N'-methylene bis(meth)acrylamide; poly(meth)acrylate compounds such as (poly)ethylene glycol di(meth)acrylate, (poly)propylene glycol di(meth)acrylate, glycerol di(meth) acrylate, glycerol acrylate methacrylate, trimethylolpropane di (meth) acrylate, trimethylol propane acrylate methacrylate, pentaerythritol di(meth)acrylate, glycerol tri (meth) acrylate, trimethylolpropane tri (meth) acrylate, pentaerythritol tri(meth)acrylate, and pentaerythritol tetra-(meth)acrylate; polyallyl compounds such as triallyl amine, (poly)allyloxy alkane, triallyl cyanurate, triallyl isocyanurate, and triallyl phosphate; polyglycidyl compounds such as (poly)ethylene glycol diglycidyl ether, propylene glycol diglycidyl ether, glycerol diglycidyl ether, and glycerol triglycidyl ether; polyisocyanate compounds such as 2,4-toluylene diisocyanate and hexamethylene diisocyanate; polyoxazoline compounds; reactive group-containing (meth)acryl amides or (meth)acrylates such as N-methylol (meth)acryl amide and glycidyl (meth)acrylate; and polyvalent metal salts such as aluminum chloride, magnesium chloride, calcium chloride, aluminum sulfate, magnesium sulfate, and calcium sulfate may be cited. One member or a mixture of two or more members selected in consideration of reactivity from among these cross-linking agent may be used.

From the viewpoint of the quality of the produced cross-linked polymer as an absorbent resin, the first cross-linking agent is properly a compound having not less than two polymerizable unsaturated double bonds in the molecular unit thereof, preferably a poly(meth)acryl amide compound or a poly(meth)acrylate compound. Though the amount of the first cross-linking agent to be used is not particularly limited, it is in the range of 0.001–20% by weight, preferably 0.005–5% by weight, based on the amount of the water-soluble ethylenically unsaturated monomer, depending on the kind of the cross-linking agent to be used. If the amount to be used is less than 0.001% by weight, the produced hydrogel polymer will have an unduly small cross-link density, a notably large uncross-linked part, and a large content of soluble component. If this amount exceeds 20% by weight, the produced cross-linked polymer will have a small absorption capacity.

By polymerizing the monomer component mentioned above in the presence of such a hydrophilic polymer as starch, cellulose, polyvinyl alcohol, or poly(meth)acrylic acid besides the first cross-linking agent mentioned above, the formation of the polymer may be attained in conjunction with the formation of a graft bond or a complex. Properly, the hydrophilic polymer is used in an amount in the range of, for example, 0.5–50% by weight, based on the amount of the water-soluble ethylenically unsaturated monomer. The aqueous solution of the polymerizable monomer, when necessary, may use a viscosity enhancer therein. As typical examples of the viscosity enhancer, polyvinyl pyrrolidone, polyacryl amide, methyl cellulose, and hydroxyethyl cellulose may be cited.

Properly, the concentration of the aqueous polymerizable monomer solution in this invention is such that the amount of the water-soluble ethylenically unsaturated monomer is in the range of 10–80% by weight, preferably 10–45% by weight, and more preferably 10–35% by weight, based on the weight of the aqueous solution mentioned above. If the concentration mentioned above is less than 10% by weight, the step of polymerization will be deficient in productivity and the step of drying will call for unduly large energy. Conversely, if this concentration exceeds 80% by weight, the reaction of polymerization will be controlled with difficulty, the maximum to which the temperature of the polymerization system is elevated by the heat of polymerization will be unduly high, the content of soluble component will be unduly large, and the absorption properties will be possibly degraded.

As a means for polymerizing the aqueous polymerizable monomer solution in this invention, any of the standard methods of polymerization can be used. The method which uses a radical polymerization initiator and the method of polymerization which resorts to an activated energy ray may be cited as examples. The method which uses a water-soluble radical polymerization initiator proves particularly favorable. This water-soluble radical polymerization initiator may be selected from among the compounds well known to the art. As typical examples of these compounds, persulfates such as potassium persulfate, sodium persulfate, and ammonium persulfate; peroxides such as hydrogen peroxide, t-butyl hydroperoxide, and cumene hydroperoxide; azo compounds such as 2,2'-azobis(2-methyl-N-phenyl propionamidine) dihydrochloride, 2,2'-azobis[N-(4-chlorophenyl)-2-methyl propionamidine] dihydrochloride, 2,2'-azobis[N-(4-hydroxyphenyl)-2-methyl propionamidine] dihydrochloride, 2,21-azobis[2-methyl-N-(2-propenyl) propionamidine] dihydrochloride, 2,2'-azobis[2-methyl-N-(phenylmethyl) propionamidine] dihydrochloride, 2,2'-azobis(2-methyl propionamidine) dihydrochloride, 2,2'-azobis[N-(2-hydroxyethyl)-2-methyl propionamidine] dihydrochloride, 2,2'-azobis[2-(5-methyl-2-imidazolin-2-yl) propane] dihydrochloride, 2,2'-azobis[2-(2-imidazolin-2-yl) propane] dihydrochloride, 2,2'-azobis{2-(4,5,6,7-tetrahydro-1H-1,3-diazepin-2-yl) propane] dihydrochloride, 2,2'-azobis[2-(3,4,5,6-tetrahydropyrimidin-2-yl) propane] dihydrochloride, 2,2'-azobis[2-(5-hydroxy-3,4,5,6-tetra-hydropyrimidin-2-yl) propane] dihydrochloride, 2,2'-azobis{2-[1-(2-hydroxyethyl)-2-imidazolin-2-yl] propen} dihydrochloride, and 2,2'-azobis[2-(2-imidazolin-2-yl) propane]; and secondary cerium salts and permanganates may be cited.

It is particularly advantageous from the viewpoint of the quality of the cross-linked polymer to be obtained and the safety of the compound to use one member or a mixture of two or more members selected from the group consisting of persulfates, peroxides, and azo compounds among other water-soluble radical polymerization initiators enumerated above. When the radical polymerization initiator is an oxidizable radical polymerization initiator, it may be used as a redox initiator by being combined with a reducing agent to be selected from among sulfites; hydrogen sulfites; thiosulfates; dithionites; metal salts such as cuprous sulfate and ferrous sulfate; organic reducing agents such as L-ascorbic acid; and amines such as aniline and monoethanolamine. Though the amount of the polymerization initiator to be used is not particularly limited, it is generally in the range of 0.001–10% by weight, preferably 0.002–5% by weight, based on the amount of the monomer component. If this amount is less than 0.001% by weight, the polymerization time and the induction period will be unduly long and the amount of the residual monomer will tend to be unduly large. If the amount exceeds 10% by weight, the polymerization reaction will not be easily controlled and the produced cross-linked polymer will tend to be deficient in quality.

The polymerization initiator which is particularly favorable in implementing the method of production of this invention is what is obtained by combining a thermally decomposing initiator with at least two kinds of oxidizable radical polymerization initiators having different decomposition temperatures and a reducing agent. As preferred thermally decomposable initiators, the azo compounds mentioned above may be cited. For fulfilling the objects of this invention, it is advantageous to use a redox initiator which is capable of initiating polymerization at a low temperature in combination with an azo compound and a persulfate which are effective in decreasing the amount of the residual monomer in the produced hydrogel polymer.

Specifically, the redox initiator which is capable of initiating polymerization at a low temperature as mentioned above is a redox initiator which initiates the polymerization at a temperature in the range of 0°–40° C., preferably 0°–30° C., and possesses an induction period in the range of 0–1 hour, preferably 0–30 minutes, and more preferably 0–10 minutes.

In the present invention, the temperature for initiating the polymerization is not particularly limited but may be properly selected depending on the decomposition temperature of the polymerization initiator to be used. It is generally in the range of 0°–45° C., preferably 0°–40° C. If the temperature for initiating the polymerization is unduly low, the induction time will be elongated and the productivity will be possibly degraded. In contrast, if the temperature for initiating the polymerization is unduly high, the polymerization reaction or the generation of the heat of polymerization will not be easily controlled, the maximum to which the temperature of the polymerization system is elevated will be unduly raised, the content of soluble component will be unduly increased, and the properties will be degraded.

The method for the production of the cross-linked polymer of the present invention essentially comprises a step of performing the polymerization in a substantially static state from the time at which the polymerization is initiated till the time at which the polymerization system is wholly gelated (hereinafter referred to as "the retention period")), a step of exerting a thorough shearing force on the polymerization system after the retention period thereby converting the hydrogel polymer into particles (hereinafter referred to as "the gel disintegrating step"), and s step of further continuing the polymerization until the temperature of the polymerization system is elevated by the heat of polymerization until the maximum (hereinafter referred to as "the continued polymerization step").

The polymerization reaction vessel to be used during the retention period and in the continued polymerization step may be any of the vessels heretofore known to the art. One same vessel may be used or two different vessels may be used. The polymerization reaction vessel to be used in the continued polymerization step is preferred to be furnished with a proper jacket and rotary arms or stirring vanes for the sake of optimally controlling the polymerization system with respect to the maximum of the temperature to be reached. The component steps mentioned above may be continuously carried out in one and the same polymerization reaction vessel or they may be severally carried out at different sites or may be carried out as suitably combined.

As a means for reducing the hydrogel polymer to particles at the gel disintegrating step mentioned above, any of the gel disintegrating and/or pulverizing devices heretofore known to the art may be used. As concrete examples of these devices, screw type extruding devices such as meat choppers which are possessed of a perforated plate, extruders, shredders, edge runners, cutter mills, and screw type crushers (such as, for example, a product of Nippon Spindle Seizo K.K. marketed under trademark designation of "Alpha") may be cited. The hydrogel polymer may be reduced to particles in a polymerization reaction vessel provided with rotary arms or stirring vanes by dint of the shearing force generated by the rotation of the rotary arms or stirring vanes. The reaction vessel is preferred to exert a large shearing force on the hydrogel polymer. Such batch type devices as kneaders, (mechanical) pressing kneaders, internal mixers and Bambury mixers and such continuous devices as continuous kneaders may be cited as examples.

In the method of production according to this invention, it is particularly proper to use the polymerization reaction vessel provided with a rotary arm or a stirring vane because it allows the three steps mentioned above to be carried out continuously therein, exerts a large stirring force on the hydrogel polymer, exerts a large heat transfer area, and permits the maximum temperature to be easily controlled. Especially, a twin arm type kneader is used advantageously. Such pressure kneaders as are disclosed in JP-A-05-112,654 and JP-A-05-247,225 are used favorably.

It has been heretofore known to perform the polymerization in a reaction vessel provided with rotary arms or stirring vanes and, in concert with the advance of the polymerization, divide finely the hydrogel polymer formed by the polymerization with the shearing force generated by the rotation of the rotary arms or stirring vanes. Probably because attentions have been focused exclusively on the fine division of the hydrogel polymer for the purpose of promoting the removal of the heat of polymerization or the uniformization of the polymerization system, no attempt has ever been made to interject the retention period of the sort contemplated by the present invention. When the provision of the retention period is omitted, the produced cross-linked polymer tends to suffer a decrease in the absorption capacity. It is conceivable that the effect of the present invention is obtained by the provision of the retention period because this retention period enables the molecular weight to be increased even under the conditions which do not warrant any expectation of the Trommsdorff effect during the initial stage of polymerization or allows formation of a uniform network of cross links without requiring any mechanical stirring. The present invention is not restricted in any sense by the theory of this sort.

In this invention, the polymerization is preferred to be continued under a substantially static state until the temperature of the polymerization system reaches at least 40° C., More preferably, the polymerization is to be continued under a substantially static state until the temperature of the polymerization system reaches at least 50° C.

The cross-linked polymer aimed at by this invention may not be obtained when the retention period is terminated and followed by the exertion of the shearing force on the polymerization system when the temperature of the polymerization system is lower than 40° C. To be specific, this premature termination of the retention period possibly results in increasing the content of soluble component or decreasing the absorption capacity. The polymerization is continued more properly under a substantially static state until the temperature of the polymerization system reaches 60° C., depending on the concentration of the aqueous polymerizable monomer solution or the temperature of initiating the polymerization.

If the shearing force is not exerted on the polymerization system even after the temperature of the polymerization system has surpassed 70° C., the fine division of the hydrogel polymer will not be attained, the maximum level which is reached by the temperature of the polymerization system will be raised excessively, the content of soluble component will be increased, and the properties will be possibly degraded.

The retention period is preferred to have a length of at least 60 seconds. If it is less than 60 seconds, the effect of this invention will not be easily obtained. The retention period is more preferably at least 120 seconds and most preferably at least 180 seconds.

The method for the production of the cross-linked polymer of this invention, in a preferred embodiment thereof, limits the total amount of dynamic energy exerted on the polymerization system per unit weight during the retention period mentioned above below about 800 joules/kg. The dynamic energy exerted on the polymerization system can be found from the input electric power to the motor used in stirring the polymerization system. The cross-linked polymer having a high absorption capacity and a small content of soluble component as aimed at by the present invention can be obtained by decreasing markedly the dynamic energy exerted on the polymerization system during the retention period. The total amount of the dynamic energy exerted on the polymerization system during the retention period is preferably not more than about 800 joules/kg, more preferably not more than about 500 joules/kg, and most preferably about 0 joule/kg.

The method for the production of the cross-linked polymer according to this invention, after the elapse of the retention period mentioned above, requires to exert an ample shearing force on the polymerization system and pulverize the hydrogel polymer into particles. The hydrogel polymer, when pulverized into particles, acquires an increase in surface area, allows more effective cooling owing to the vaporization of the water or by means of a jacket of the reaction vessel, and facilitates control of the polymerization temperature.

By the time that the temperature of the polymerization system reaches the maximum level, the hydrogel polymer is preferred to have been pulverized to a point where particles measuring more than 150 mm are no longer present. If the particles produced by the pulverization of the hydrogel polymer have a size exceeding 150 mm when the maximum level of temperature is reached, the temperature of the polymerization system will not be easily controlled, the produced cross-linked polymer will have an increased content of soluble component, the temperature distribution within the polymerization system will be broadened, and the produced polymer will fail to acquire uniform properties. The size of the hydrogel polymer will be represented by the shortest length thereof. The particles resulting from the pulverization of the hydrogel polymer advantageously avoid containing those of a size exceeding 100 mm, preferably those of a size exceeding 50 mm, and more preferably those of a size exceeding 30 mm.

The method for the production of the cross-linked polymer of this invention is preferred to control the maximum level to be reached by the temperature of the polymerization system within the range of 65°–85° C. If the maximum temperature is unduly low, the polymerization ratio of the polymerizable monomer will be lowered and the amount of residual monomer in the produced cross-linked polymer will be increased. Conversely, if the maximum temperature is unduly high, the properties will tend to be degraded as evinced by an increase in the content of soluble component. The maximum temperature to be reached by the polymerization system can be easily controlled because this invention essentially pulverizes the hydrogel polymer into particles. Specifically, the hydrogel polymer acquires an increase in surface area and, when the polymerization system is rather exothermal than otherwise, allows an addition to the latent heat due to the vaporization of water and, at the same time, permits more efficient cooling due to the conduction of heat by the reaction vessel or the jacket provided therefor.

The method of production according to this invention allows the produced hydrogel polymer to be briefly ruptured during the course of the retention period. This operation of rupturing possibly facilitates the pulverization of the hydrogel polymer into particles after the retention period. Though the method to be adopted for effecting this brief rupturing varies with the polymerization reaction vessel to be used during the retention period, a method resorting to the rotation of rotary arms or stirring vanes which are provided in the polymerization vessel proves particularly favorable. The time for performing the rupture is properly selected at or after the time by which the polymerization system has been gelated to a degree enough to be ruptured by the shearing force. The degree of this rupture has to be such as to reduce the hydrogel polymer to large blocks. The time for the rupture may be generally within 30 seconds.

The method of production according to this invention prefers the polymerization system which has reached the maximum temperature to be retained at a temperature in the range of 50°–85° C. for at least 5 minutes, preferably at least 10 minutes, from the viewpoint of obtaining a cross-linked polymer having only a small amount of residual monomer. In this while, the hydrogel polymer maybe further divided finely, when necessary, by the rotation of rotary arms or stirring vanes. More advantageously, the polymerization system is retained in the atmosphere of an inert gas during the process of polymerization.

Further, the method of production according to the present invention may allow the polymerization system which as reached the maximum temperature to be mixed with an oxygen-containing sulfur type reducing agent for the purpose of decreasing the amount of residual monomer. Properly, this mixture is effected when the temperature of the hydrogel polymer is at least 45° C. The oxygen-containing sulfur type reducing agent to be used in this invention has no particular restriction except the requirement that it be an oxygen-containing sulfur type compound capable of producing a reducing action. As typical examples of this compound, sulfites such as sulfurous acid, sodium sulfite, and potassium sulfite; hydrogen sulfites such as sodium hydrogen sulfite and potassium hydrogen sulfite; and thiosulfates such as sodium thiosulfate and potassium thiosulfate may be cited. Among other oxygen-containing sulfur type compounds mentioned above, sodium hydrogen sulfite proves particularly advantageous. Though the amount of the oxygen-containing sulfur type reducing agent to be used is not particularly limited, it is generally in the range of 0.001–5% by weight, preferably 0.01–2% by weight, based on the weight of the water-soluble ethylenically unsaturated monomer. The method of addition of this reducing agent to the hydrogel polymer may be any of the methods of addition and mixture heretofore known to the art. For example, the oxygen-containing sulfur type reducing agent in a powdery form may be directly added or this reducing agent may be added as dissolved or dispersed in water or an organic solvent.

The hydrogel polymer obtained in a particulate form by the method for the production of a cross-linked polymer according to this invention may be further divided finely by the use of a gel disintegrating and/or pulverizing device. The hydrogel polymer, when necessary, may be properly heated to a temperature in the range of 45°–90° C. in preparation for the fine division. For the fine division, any of the gel disintegrating and/or pulverizing devices heretofore known to the art may be used. Particularly, the fine division is preferred to be effected by extruding the hydrogel polymer through a perforated plate in accordance with the method disclosed in JP-A-05-70,597, JP-A-06-41,319, etc. The coarse particles possibly contained in the particulate hydrogel polymer may be separated by such a gel classifying device as disclosed in JP-A-06-107,800 and then subjected to fine division.

The cross-linked polymer which has been obtained by the method of production according to this invention may be dried by any of the methods heretofore known to the art. A method which azeotropically dehydrates the cross-linked polymer in an organic solvent and a method which dries the cross-linked polymer by the use of a forced drafting furnace, a reduced pressure drying device, a microwave drying device, an infrared ray drying device, or a belt or drum drier heated to a prescribed temperature may be cited as typical examples. By the use of such a drying method, the hydrogel polymer resulting from the polymerization can be dried at a temperature in the range of 500–230° C., preferably 50°–180° C. If this temperature is lower than 50° C., the time required for the drying will be so long as to affect the productivity adversely. If the temperature exceeds 230° C., the cross-linked polymer will possibly be deteriorated. Generally, the method is preferred to dry the hydrogel polymer until the solids content exceeds 60% by weight, preferably 90% by weight.

The cross-linked polymer which has been dried as described above, when necessary, may be pulverized and/or classified by any of the methods heretofore known to the art. As typical examples of the device available for this purpose, high-speed rotary pulverizers (such as pin mills, hammer mills, etc.), screw mills (such as coffee mills), and roll mills may be cited. When the cross-linked polymer in a powdery form is aimed at, it is so prepared as to acquire an average particle diameter in the range of 10–2000 μm, preferably 100–1000 μm, and more preferably 300–600 μm. The prepared powder of the cross-linked polymer is preferred to have a narrow particle size distribution.

The cross-linked polymer which is obtained by the method of production according to this invention exhibits excellent absorption properties as evinced by a large absorption capacity and a small content of soluble component as compared with the conventional cross-linked polymer.

This invention further provides a method for the production of an absorbent resin, which is characterized by the steps of drying and pulverizing the cross-linked polymer obtained by any of the methods of production mentioned above thereby producing cross-linked polymer particles, mixing the cross-linked polymer particles with a second cross-linking agent capable of reacting with at least two functional groups in the proximity of the surface of the cross-linked polymer particles, and subjecting the resultant mixture to a heat treatment.

The second cross-linking agent to be used in this invention, when the cross-linked polymer is possessed of carboxyl groups, has no particular restriction except the requirement that it be a compound capable of reacting with at least two carboxyl groups. As typical examples of this compound, polyhydric alcohol compounds such as ethylene glycol, propylene glycol, glycerol, pentaerythritol, sorbitol, diethylene glycol, triethylene glycol, tetraethylene glycol, dipropylene glycol, tripropylene glycol, 1,3-butanediol, 1,4-butanediol, 1,5-pentanediol, 2,4-pentanediol, 1,6-hexanediol, 1,5-hexanediol, and trimethylolpropane; polyepoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, and polypropylene glycol diglycidyl ether; polyamines such as diethanolamine, triethanolamine, ethylenediamine, diethylenetriamine, and triethylenetetramine; polyisocyanates such as 2,4—tolylene diisocyanate and hexamethylene diisocyanate; and ethylene carbonate (1,3-dioxoran-2-on), propylene carbonate (4-methyl-1,3-dioxoran-2-on), 4,5-dimethyl-1,3-dioxoran-2-on, epichlorohydrin, and epibromohydrin may be cited. The second cross-linking agent is not limited to these compounds. The examples may be used either singly or in the form of a mixture of two or more members.

Though the amount of the second cross-linking agent to be used depends on the compound or the combination of compounds to be used, it is in the range of 0.001–10% by weight, preferably 0.01–5% by weight, based on 100% by weight of the solids of the cross-linked polymer. If the amount of the second cross-linking agent to be used exceeds 10% by weight, the excess will not only hurt the economy of the production but also adversely affect the formation of the optimum cross-linked structure in the produced absorbent resin. If the amount of the second cross-linking agent to be used is less than 0.001% by weight, the effect of improving the produced absorbent resin in such properties as the absorption capacity under load and the content of deteriorated soluble component will not be easily obtained. The operation of mixing the cross-linked polymer with the second cross-linking agent is preferably performed by using water as a solvent. Though the amount of water to be used herein depends on the kind of the cross-linked polymer and the particle diameter thereof, it is generally more than 0 and not more than 20% by weight and preferably in the range of 0.5–10% by weight, based on 100% by weight of the solids of the cross-linked polymer. The operation of mixing the cross-linked polymer with the second cross-linking agent, when necessary, maybe effected by using a hydrophilic organic solvent. As typical examples of this solvent, lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane and tetrahydrofuran; amides such as N,N-dimethyl formamide; and sulfoxides such as dimethyl sulfoxide may be cited.

Though the amount of the hydrophilic organic solvent to be used depends on the kind of the cross-linked polymer and the particle diameter thereof, it is generally not more than 20% by weight and preferably in the range of 0.1–10% by weight, based on 100% by weight of the solids of the cross-linked polymer. The operation of mixing the cross-linked polymer with the second cross-linking agent imposes no particular restriction on the method to be adopted therefor. Among various mixing methods, a method which effects the mixture by dissolving the second cross-linking agent in water and/or a hydrophilic organic solvent and directly mixing the resultant solution with the cross-linked polymer by spraying or dropwise addition proves particularly advantageous. When the mixture is effected by the use of water, it may be carried out in the presence of a water-insoluble fine powder and a surfactant. The mixing device to be used in the operation of mixing the cross-linked polymer with the second cross-linking agent is preferred to be endowed with a large mixing force for the purpose of ensuring uniform and infallible mixture of the two components. As concrete examples of the mixing device, cylindrical mixing devices, double wall conical mixing devices, V-shaped mixing devices, ribbon type mixing devices, screw type mixing devices, fluidized furnace rotary disc type mixing devices, air current type mixing devices, twin arm type kneaders, internal mixing devices, pulverizing type kneaders, rotary type mixing devices, and screw type extruding devices maybe cited.

After the cross-linked polymer and the second cross-linking agent have been mixed, the resultant mixture is heat-treated to have the neighborhood of the surface of the cross-linked polymer cross-linked with the second cross-linking agent. Though the temperature of the heat treatment mentioned above depends on the cross-linking agent to be used, it is properly not lower than 50° C. and not higher than 250° C. If the treatment is lower than 50° C., no uniform cross-linked structure will be formed and the production of an absorbent resin excelling in such properties as the absorption capacity under load will not be attained. If this temperature exceeds 250° C., the produced absorbent resin will succumb to deterioration and suffer from degradation of quality. The heat treatment mentioned above may be performed by the use of a standard drying device or heating oven. As typical examples of the drying device, groove type mixing driers, rotary driers, disc driers, fluidized-bed driers, air current type driers, and infrared ray driers maybe cited.

The cross-linked polymer which is obtained with high productivity by the present invention enjoys excellent features such as a high absorption capacity and a small content of soluble component. Further, the irregular absorbent resin obtained from the cross-linked polymer mentioned above has the heretofore unattainable characteristics such as a high absorption capacity without load of at least 30 g/g, preferably at least 35 g/g, a high absorption capacity under load of at least 25 g/g, preferably at least 28 g/g, and a small content of deteriorated soluble component of not more than 15% by weight, preferably not more than 10% by weight.

(1) Since the absorbent resin has high absorption capacity without load and under load, the disposable diaper using this absorbent resin can absorb and retain a large amount of urine while withstanding the body weight of an infant and that of an adult as the load.

(2) Since the absorbent resin has only a small content of soluble component, a user wearing the disposable diaper does not incur the otherwise possible objectionable feeling of the ropiness.

(3) Since the absorbent resin has only a small content of deteriorated soluble component, the disposable diaper can retain the excellent qualities mentioned in (1) and (2) above for a long time.

(4) Since the absorbent resin has an irregular texture, the disposable diaper worn on a user's body sheds resin particles only sparingly from the absorbent core thereof and warrants high safety for the user's skin.

The cross-linked polymer and the absorbent resin which are obtained by this invention manifest the effects mentioned above and, therefore, can be used optimally in such sanitary materials as disposable diapers for infants and adults, sanitary napkins, incontinence pads, breast pads, and pet sheets.

The cross-linked polymer and the absorbent resin which are obtained by this invention are also usable for water retaining materials such as freshness retaining materials, refrigerating materials, drip absorbing materials, frost preventing materials, water stopping materials and packing materials in the field of civil engineering and construction, and waterproofing materials for electric wires and optical fibers.

Now, this invention will be described below with reference to working examples. It should be noted, however, that the scope of this invention is not limited to these working examples. In this invention, the cross-linked polymer is tested for the absorption capacity and the content of soluble component and the absorbent resin for the absorption capacity without load, the absorption capacity under load, and the content of deteriorated soluble component by the following methods.

(A) Cross-Linked Polymer's Absorption Capacity.

A cross-linked polymer, $W_1$ (g), of the form of a particulate hydrogel having a solids content of A % by weight (containing about 0.2 g of 100% by weight of solids) is uniformly placed in a pouch (60 mm×60 mm) made of non-woven fabric. The pouch containing the polymer is immersed in an aqueous 0.9 wt % sodium chloride solution (physiological saline solution). The pouch, after 24 hours' standing in the solution, is lifted from the solution, strained by the use of a centrifugal separator at 250 G for 3 minutes, and then weighed, $W_2$ (g). The same procedure is repeated without using the hydrogel cross-linked polymer to find the weight, $W_0$ (g) The absorption capacity (g/g) is calculated in accordance with the following formula using the weights, $W_1$, $W_2$, and $W_0$.

Absorption capacity (g/g)=$[(W_2 (g)-W_0 (g))/W_1 (g)]\times(100/A)-1$ (B) Cross-Linked Polymer's Content Of Soluble Component A cross-linked polymer, $W_3$ (g), of the form of a particulate hydrogel having a solids content of A % by weight (containing about 0.5 g of 100% by weight of solids) is dispersed in 1000 g of deionized water and stirred therein for 16 hours. The resultant dispersion is passed through a filter paper. Then, 50 g of the filtrate is placed in a beaker, 100 ml in inner volume, and 1 ml of an aqueous 0.1 N sodium hydroxide solution, 10 ml of an aqueous N/100 methyl glycol chitosan solution, and four drops of an aqueous 0.1% toluidine blue solution are added to the filtrate. Subsequently, the solution in the beaker is subjected to colloidal titration with an aqueous N/400 polyvinyl potassium sulfate solution, with the end point of the titration set at the time at which the color of the solution turns from a blue to a reddish purple color, to find the magnitude of titration, B (ml). The same procedure is repeated on 50 g of deionized water in the place of 50 g of the filtrate to find the magnitude of titration, C (ml), as a blank. The content of soluble component (% by weight) is calculated in accordance with the following formula using the magnitudes of titration, B and C, and the molecular weight, D, of the repeating unit of the hydrogel cross-linked polymer.

Content of soluble component (% by weight)=$[(C-B)\times 0.005\times D/W_3]\times(100/A)$ (C) Absorbent Resin's Absorption Capacity Without Load A pouch (60 mm×60 mm) made of non-woven fabric having 0.2 g of the absorbent resin uniformly placed therein is immersed in an aqueous 0.9 wt % sodium chloride solution (physiological saline solution). The pouch, after 30 minutes' standing in the solution, is lifted from the solution, strained by the use of a centrifugal separator at 250 G for 3 minutes, and then weighed, $W_4$ (g). The same procedure is repeated without using the absorbent resin to find the weight, $W_0$ (g). The absorption capacity (g/g) is calculated in accordance with the following formula using the weights, $W_4$ and $W_0$.

Absorption capacity without load (g/g)=$(W_4 (g)-W_0 (g))$/weight of absorbent resin (g)-1

(D) Absorbent Resin's Absorption Capacity Under Load

First, the measuring apparatus to be used for the determination of the absorption capacity under load will be briefly explained below with reference to FIG. 1.

The measuring apparatus, as illustrated in FIG. 1, is composed of a balance 1, a container 2 having a prescribed inner volume and mounted on the balance 1, an external air aspirating pipe 3, a conduit 4, a glass filter 6, and a measuring part 5 mounted on the glass filter 6. The container 2 is provided in the top part thereof with an opening part 2a and in the lateral part thereof with an opening part 2b. The external air aspirating pipe 3 is inserted into the opening part 2a and the conduit 4 is fitted to the opening part 2b. The container 2 is filled with a prescribed amount of physiological saline solution 12. The lower end part of the external air aspirating pipe 3 is plunged in the physiological saline solution 12. The external air aspirating pipe 3 is provided for the purpose of retaining the pressure inside the container 2 substantially at the atmospheric pressure. The glass filter 6 mentioned above is formed in a diameter of 70 mm. The container 2 and the glass filter 6 communicate with each other through the medium of the conduit 4 which is made of silicone resin. The glass filter 6 has the position and the height thereof fixed relative to the container 2. The measuring part 5 is provided with a filter paper 7, a supporting cylinder 9, 60 mm in inside diameter, a metal net 10 applied fast to the bottom part of the supporting cylinder 9, and a weight 11. In the measuring part 5, the filter paper 7 and the supporting cylinder 9 (namely the metal net 10) are sequentially superposed in the order mentioned on the glass filter 6 and, at the same time, the weight 11 is mounted inside the supporting cylinder 9, namely on the metal net 10. The metal net 10 is made of stainless steel and formed with a pore size of 400 mesh (38 $\mu$m in size of mesh). Then, the upper surface of the metal net 10, namely the interface between the metal net 10 and an absorbent resin 15, is set flush with a lower end face 3a of the external air aspirating pipe 3. On the metal net 10, a prescribed amount of the absorbent resin is intended to be uniformly scattered. The weight 11 which weighs 1390 g is adapted to exert a load uniformly on the metal net 10, namely the absorbent resin 15.

The measuring apparatus constructed as described above is used in determining the absorption capacity under load. The method of determination is described below.

First, the prescribed amount of the physiological saline solution 12 is placed in the container 2. The external air aspirating pipe 3 is inserted into the container 2. Other necessary preparations are made. Next, the filter paper 7 is mounted on the glass filter 6. Parallelly with this mounting action, 0.9 g of the absorbent resin is uniformly scattered inside the supporting cylinder 9, namely on the metal net 10 and the weight 11 is set in place on the absorbent resin 15. Then, on the filter paper 7, the metal net 10, namely the supporting cylinder 9 having the absorbent resin 15 and the weight 11 mounted thereon is so mounted that the center thereof may coincide with the center of the glass filter 6. From the time at which the supporting cylinder 9 is mounted on the filter paper 7, the weight, $W_5$ (g), of the physiological saline solution 12 absorbed by the absorbent resin 15 is found from the scale reading of the balance 1 along the course of time for a period of 60 minutes. The same procedure is repeated without using the absorbent resin 15 to find the blank weight, namely the weight [blank weight, $W_6$ (g)] of the physiological saline solution 12 absorbed by the filter paper 7 instead of the absorbent resin, from the scale reading of the balance 1. Then, the weight, $W_7$ (g), of the physiological saline solution actually absorbed by the absorbent resin over the period of 60 minutes after the start of absorption is found by deducting the blank weight, $W_6$ (g), from the weight, $W_5$ (g). The absorption capacity under load (g/g) is calculated in accordance with the following formula using the weight, $W_7$ (g), and the weight of the absorbent resin (0.9 g).

Absorption capacity under load (g/g)=Weight, $W_7$ (g)/Weight of absorbent resin (g)

(E) Absorbent Resin's Content of Deteriorated Soluble Component

In a lidded plastic container, 100 ml in inner volume, 1 g of absorbent resin classified in advance in a range of 300–600 μm and prepared is swelled with synthetic urine (composed of 95 g of urea, 40 g of sodium chloride, 5 g of magnesium sulfate, 5 g of calcium chloride, 0.25 g of L-ascorbic acid, and 4855 g of deionized water) to 25 times the original volume thereof and then left standing at a temperature of 37° C. for 16 hours. After the elapse of the 16 hours, the resultant swelled gel is dispersed in 975 g of deionized water and stirred therein for 1 hour. The dispersion is passed through the filter paper for one minute. Then, 50 g of the filtrate consequently obtained is placed in a beaker, 100 ml in inner volume, and 1 ml of an aqueous 0.1 N sodium hydroxide solution, 10 ml of an aqueous N/200 methyl glycol chitosan solution, and four drops of an aqueous 0.1% toluidine blue solution are added to the filtrate. Subsequently, the solution in the beaker is subjected to colloidal titration by the use of an aqueous N/400 polyvinyl potassium sulfate solution, with the end point of the titration set at the time at which the color of the solution turns from a blue to a reddish purple color, to find the magnitude of titration, B (ml). The same procedure is repeated without using the absorbent resin to find the magnitude of titration, C (ml), as a blank. The content of deteriorated soluble component (% by weight) is calculated in accordance with the following formula using the magnitudes of titration, B and C, and the molecular weight, D, of the repeating unit of the hydrogel cross-linked polymer.

Content of deteriorated soluble component (% by weight)=$(C-B) \times 0.005 \times D$

EXAMPLE 1

In 6570 g of an aqueous solution containing partially neutralized sodium acrylate having a neutralization ratio of 75 mol % in a concentration of 30% by weight, 10.6 g (0.1 mol % based on the monomer) of polyethylene glycol diacrylate (PEGDA) as a first cross-linking agent was dissolved. In a reaction vessel formed by lidding a jacketed twin arm kneader (produced by Koike Tekko K.K.) of stainless steel having an inner volume of 10 liters and provided with two sigma type blades, the resultant solution having a temperature of 30° C. by a jacket recycling 30° C. of water was left standing and the interior of the reaction vessel and dissolved oxygen in the solution were meanwhile displaced with nitrogen gas. Then, the solution in the vessel was stirred at 40 rpm by the blades of the kneader and meanwhile made to add 15.6 g of an aqueous 20 wt % sodium persulfate solution and 14.9 g of an aqueous 0.1 wt % L-ascorbic acid solution as polymerization initiators so as to induce polymerization of the solution. The blades were stopped at the time that the initiation of polymerization was confirmed by the opacification of the solution as a signal and the solution was left polymerizing until the inner temperature of the vessel reached 60° C. under removing heat by the jacket (retention period). At the time at which the inner temperature of the vessel surpassed 60° C. (at which time the polymerization system ceased to manifest fluidity and assumed the form of a gel), the blades were set rotating to crush the gel into particles and the polymerization was further continued until the inner temperature reached the maximum of 75° C. For the subsequent 20 minutes, the temperature of the jacket was elevated to 60° C. and the gel was disintegrated and meanwhile retained at a polymerization temperature above 65° C. to complete the polymerization and obtain a cross-linked polymer (1) of the form of a particulate hydrogel. The produced cross-linked polymer (1) was tested for the absorption capacity and the content of soluble component. The results are shown in Table 1.

EXAMPLE 2

A cross-linked polymer (2) of the form of a particulate hydrogel was obtained by repeating the procedure of Example 1 while changing the amount of PEGDA to be used to 6.39 g (0.06 mol % based on the monomer). In this case, the maximum inner temperature of the vessel was 76° C. The produced cross-linked polymer (2) was tested for the absorption capacity and the content of soluble component. The results are shown in Table 1.

EXAMPLE 3

A cross-linked polymer (3) of the form of a particulate hydrogel was obtained by repeating the procedure of Example 1 while causing the formed hydrogel polymer to be briefly ruptured at 40 rpm for 30 seconds when the inner temperature of the vessel reached 40° C. during retention time. In this case, the maximum inner temperature of the vessel was 72° C. The produced cross-linked polymer (3) was tested for the absorption capacity and the content of soluble component. The results are shown in Table 1.

EXAMPLE 4

The gel polymer obtained at about 65° C. by the polymerization performed in the same manner as in Example 1 and 39.4 g of an aqueous 10% sodium hydrogen sulfite solution added thereto were thoroughly mixed together. Subsequently, the resultant hydrogel polymer was extruded through a screw type extruding device provided with a perforated plate, 10 mm in thickness, 12.5 mm in pore diameter, and 30% in opening ratio, as a chopper (produced by Hiraga Kosakusho K.K.) to obtain a cross-linked polymer (4) of the form of a particulate hydrogel. The produced cross-linked polymer (4) was tested for the absorption capacity and the content of soluble component. The results are shown in Table 1.

EXAMPLE 5

In the same polymerization vessel as used in Example 1, 3.59 g (0.06 mol % based on the monomer) of PEGDA as a first cross-linking agent was dissolved in 3600 g of an aqueous solution containing partially neutralized sodium acrylate having a neutralization ratio of 65 mol % in a concentration of 30% by weight and the resultant solution obtained at 25° C. was left standing by a jacket recycling 25° C. of water and the interior of the vessel and dissolved oxygen in the solution were meanwhile displaced with nitrogen gas. Next, the solution in the vessel was stirred at 40 rpm by the blades of the kneader and meanwhile made to add 12.5 g of an aqueous 10% by weight of 2,2'-azobis (2-amidinopropane) dihydrochloride solution, 6.3g of 10% by weight: sodium persulfate solution, 8.8 g of an aqueous 0.1 wt % L-<ascorbic acid solution and 5.4g of 0.35% by weight aqueous hydrogen peroxide solution as polymerization initiators so as to induce polymerization of the solution. After confirming the polymerization as white turbidity, the blades were stopped at the time that the inner temperature of the reaction vessel reaches to 30° C., and then standing the solution under removing heat by the jacket and kept it until the inner temperature reaches to 60° C. (retention time). At the time that the inner temperature of the vessel surpassed 60° C. (at the time when the polymerization system lost fluidity and formed the gel), the blade is rotated to pulverize the gel-like product and the reaction was continued so that the maximum temperature of the vessel became to not less than 77° C. The particulate cross-linked polymer (5) was obtained by a similar method to Example 1. The produced cross-linked polymer (5) was tested for the absorption capacity and the content of soluble component. The results are shown in Table 1.

EXAMPLE 6

In the same polymerization vessel as used in Example 1, 8.90 g (0.1 mol % based on the monomer) of PEGDA as a first cross-linking agent was dissolved in 5500 g of an aqueous solution containing partially neutralized sodium acrylate having a neutralization ratio of 75 mol % in a concentration of 30% by weight and the resultant solution obtained at 30° C. was left standing by a jacket recycling 30° C. of water and the interior of the vessel and dissolved oxygen in the solution were meanwhile displaced with nitrogen gas. Next, the solution in the vessel was stirred at 40 rpm by the blades of the kneader and meanwhile made to add 13.0 g of an aqueous 20 wt % sodium persulfate solution and 12.5 g of an aqueous 0.1 wt % L-ascorbic acid solution as polymerization initiators so as to induce polymerization of the solution. The blades were stopped at the time that the initiation of polymerization was confirmed by the rise of the inner temperature of the system as a signal and the solution was left polymerizing under removing heat by the jacket until the inner temperature of the vessel reached 60° C. (retention period). At the time that the inner temperature of the vessel surpassed 60° C. (at which time the polymerization system ceased to manifest fluidity and assumed the form of a gel), the lid was replaced with a separately prepared pressure lid and the blades were set rotating under such a condition as to exert an ample shearing force and the gel was disintegrated into particles and meanwhile left polymerizing continuously. At this time, the maximum inner temperature of the vessel was 72° C. The pressure lid was replaced with the standard lid. For the subsequent 20 minutes, the gel was disintegrated under such a condition as to avoid exertion of excessive shearing force raised a temperature of jacket to 60° C. and meanwhile retained at a temperature exceeding 65° C. to complete the polymerization and obtain a cross-linked polymer (6) of the form of a particulate hydrogel. The produced cross-linked polymer (6) was tested for the absorption capacity and the content of soluble component. The results are shown in Table 1.

EXAMPLE 7

In a reaction vessel formed by lidding a jacketed twin arm kneader of stainless steel having an inner volume of 2.5 liters and provided with two sigma type blades, 1.06 g of PEGDA (0.1 mol % based on the monomer) as a first cross-linking agent was dissolved in 800 g of an aqueous 20 wt % acrylic acid solution and the resultant solution obtained at a temperature of 20° C. was left standing by a jacket recycling 20° C. of water and the interior of the vessel and dissolved oxygen in the solution were meanwhile displaced with nitrogen gas. Next, the solution was stirred at 40 rpm by the blades of the kneader and meanwhile made to add 9.6 g of an aqueous 5 wt % 2,2'-azobis(2-amidino propane) dihydrochloride solution, 4.0 g of an aqueous 1 wt % L-ascorbic acid solution, and 4.57 g of an aqueous 3.5 wt % hydrogen peroxide solution as polymerization initiators so as to induce polymerization of the solution. The blades were stopped at the time that the initiation of polymerization was confirmed by the rise of the inner temperature of the system as a signal and the solution was left polymerizing under removing heat by the jacket until the inner temperature of the vessel reached 50° C. (retention period). At the time that the inner temperature of the vessel surpassed 50° C. (at which time the polymerization system ceased to manifest fluidity and assumed the form of a gel), the blades were set rotating and the gel was disintegrated into particles and meanwhile left polymerizing continuously. At this time, the maximum inner temperature of the vessel was 60° C. For the subsequent 1 hour, after elevating the jacket to 60° C. the gel was disintegrated and meanwhile retained at a temperature exceeding 60° C. to complete the polymerization. Further, the produced cross-linked polymer of the form of hydrogel and 76.6 g of sodium carbonate powder added thereto by virtue of the rotation of the blades were together mixed and the resultant mixture was left standing for one hour with the gel temperature kept at 60° C. to have the mixture thoroughly neutralized and obtain a cross-linked polymer (7) of the form of a particulate hydrogel. The produced cross-linked polymer (7) was tested for the absorption capacity and the content of soluble component. The results are shown in Table 1.

EXAMPLE 8

A cross-linked polymer of the form of a hydrogel was obtained by repeating the procedure of Example 6 while changing the concentration of the aqueous acrylic acid solution to 25% by weight and changing the amount of the aqueous 5 wt % 2,2'-azobis(2-amidino propane) dihydrochloride solution to 2.4 g. that of the aqueous 1 wt % L-ascorbic acid solution to 1.0 g, and that of the aqueous 3.5 wt % hydrogen peroxide solution to 1.14 g. At this time, the maximum inner temperature of the vessel was 650C. Further, the resultant cross-linked polymer of the form of hydrogel and 95.7 g of sodium carbonate powder added thereto by virtue of the rotation of the blades were together mixed and the produced gel was left standing for 1.5 hours with the temperature thereof kept at 60° C. to have the gel thoroughly neutralized and obtain a cross-linked polymer (8) of the form of a particulate hydrogel. The produced cross-linked polymer (8) was tested for the absorption capacity and the content of soluble component. The results are shown in Table 1.

EXAMPLE 9

Cross-linked polymer particles were obtained by drying the cross-linked polymer (1) of the form of a particulate hydrogel obtained in Example 1 with hot air at 160° C. for 65 minutes, then pulverizing the dried cross-linked polymer by the use of a shaking mill, and classifying the produced particles in a range of 75–850 μm in particle diameter. The cross-linked polymer particles, 100 parts in amount, and an aqueous liquid composed of 0.05 part of ethylene glycol diglycidyl ether as a second cross-linking agent, 0.5 part of glycerin, 3 parts of water, and 0.75 part of isopropyl alcohol added thereto were mixed together and the resultant mixture was heated at 200° C. for 50 minutes to obtain an absorbent resin (9). This absorbent resin (9) was tested for the absorption capacity without load and under load and the content of deteriorated soluble component. The results are shown in Table 2.

23

Control 1

A cross-linked polymer (10) of the form of a hydrogel for comparison was obtained by faithfully repeating the procedure of Example 1 while omitting the interjection of the retention period for stopping the blades from the start of polymerization. The absorbent resin (10) for comparison was tested for the absorption capacity and the content of soluble component. The results are shown in Table 1.

Control 2

A cross-linked polymer (11) of the form of a hydrogel for comparison was obtained by faithfully repeating the procedure of Example 2 while omitting the interjection of the retention period for stopping the blades from the start of polymerization. The cross-linked polymer (11) for comparison was tested for the absorption capacity and the content of soluble component. The results are shown in Table 1.

Control 3

A cross-linked polymer (12) of the form of a hydrogel for comparison was obtained by faithfully repeating the procedure of Example 1 while limiting the retention period for stopping the blades from the start of polymerization up to the time at which the maximum inner temperature of the vessel was reached. In this case, the maximum inner temperature surpassed 100° C. and the hydrogel polymer consequently succumbed to violent bumping. The cross-linked polymer (12) for comparison was tested for the absorption capacity and the content of soluble component. The results are shown in Table 1.

Control 4

In the same polymerization vessel, the same polymerizable monomers as in Example 1 were change under maintaining the temperature of 30° C. by a jacket recyling 30° C. of water and replacing with nitrogen gas. Then polymerization was initiated by 15.6 g of 20% by weight aqueous sodium persulfate solution and 14.9 g of 0.1% by weight aqueous L-ascorbic acid solution as the polymerization initiators under rotating of the kneader at 40 rpm. At the time when initiation of the polymerization was confirmed by white turbidity, the blade was stopped, it was adiabatically maintained by raising the temperature of the jacket. At the time when the inner temperature was reached to 60° C., the resultant hydrogel polymer was removed from the polymerization vessel, and was crushed by extruding through a screw type extruding device (chopper produced by Hiraga Kosakusho K. K.: pore diameter 3 mm) to obtain cross-linked polymer (13) for comparison. The temperature of the cross-linked polymer (13) particulate just after the production was cooled to 55° C. The cross linked polymer (13) for comparison was tested for the absorption capacity and the content of soluble component. The results are shown in Table 1.

Control 5

An absorbent resin (14) for comparison was obtained by repeating the drying, pulverizing, and heating treatments of Example 9 while changing the cross-linked polymer (1) of the form of a hydrogel to the cross-linked polymer (11) of the form of a hydrogel for comparison. The absorbent resin (14) for comparison was tested for the absorption capacities without load and under load and the content of deteriorated soluble component. The results are shown in Table 2.

24

TABLE 1

|  | Absorption capacity (g/g) | Content of soluble component (wt %) |
|---|---|---|
| Example 1 | 45 | 1.6 |
| Example 2 | 51 | 4.2 |
| Example 3 | 45 | 1.5 |
| Example 4 | 46 | 3.3 |
| Example 5 | 55 | 3.8 |
| Example 6 | 45 | 2.5 |
| Example 7 | 68 | 4.1 |
| Example 8 | 53 | 1.3 |
| Control 1 | 32 | 3.4 |
| Control 2 | 35 | 5.6 |
| Control 3 | 50 | 10.4 |
| Control 4 | 42 | 4.5 |

TABLE 2

|  | Absorption capacity without load (g/g) | Absorption capacity under load (g/g) | Content of deteriorated soluble component (wt%) |
|---|---|---|---|
| Example 9 | 36 | 28 | 9 |
| Control 5 | 34 | 27 | 16 |

The entire disclosure of Japanese Patent Application No. 08-142,708 filed on Jun. 5, 1996 including specification, claims drawings and summary are incorporated herein by reference in its entirety.

What is claimed is:

1. A method for the production of a cross-linked polymer by the polymerization of an aqueous polymerizable monomer solution containing a water-soluble ethylenically unsaturated monomer and a first cross-linking agent capable of forming a hydrogel polymer by polymerization, which comprises performing said polymerization in a substantially static state from the time at which said polymerization is initiated till the time at which the whole polymerization system is gelated, subsequently giving said polymerization system a thorough shearing force thereby pulverizing the hydrogel polymer before said polymerization system has the temperature thereof elevated by the heat of polymerization to the highest level, and further continuing said polymerization.

2. A method according to claim 1, wherein the polymerization of an aqueous polymerizable monomer solution containing a water-soluble ethylenically unsaturated monomer and a first cross-linking agent capable of forming a hydrogel polymer by polymerization comprises performing heat-removing polymerization in a substantially static state from the time at which the polymerization is initiated till the time at which the whole polymerization system is gelated, subsequently giving the polymerization system a thorough shearing force thereby pulverizing the hydrogel polymer before the polymerization system has a temperature thereof elevated by the heat of polymerization to the highest level, and further continuing the heat-removing polymerization.

3. A method according to claim 1, wherein the polymerization of an aqueous polymerizable monomer solution containing a water-soluble ethylenically unsaturated monomer and a first cross-linking agent capable of forming a hydrogel polymer by polymerization comprises performing the polymerization in a substantially static state from the time at which the polymerization is initiated till the time at which the whole polymerization system is gelated in a reaction vessel provided with at least one rotary arm or at least one stirring device, subsequently giving the polymerization system a thorough shearing force by the at least one rotary arm or at least one stirring device thereby pulverizing the hydrogel polymer before the polymerization system has a temperature thereof elevated by the heat of polymerization to the highest level, and further continuing the polymerization.

4. A method according to claim 1, wherein said polymerization is carried out in the substantially static state until the temperature of said polymerization system reaches at least 40° C.

5. A method according to claim 1, wherein the hydrogel polymer is briefly ruptured between the time at which said polymerization is initiated and the time at which said polymerization system is wholly gelated.

6. A method according to claim 5, wherein said hydrogel polymer is briefly ruptured by the rotation of at least one rotary arm or at least one stirring device between the time at which said polymerization is initiated and the time at which said polymerization system is wholly gelated.

7. A method according to claim 1, wherein said polymerization is carried out in the substantially static state until the temperature of said polymerization system elevated by the heat of polymerization reaches at least 50° C.

8. A method according to claim 1, wherein the duration of said static state is at least 60 seconds.

9. A method according to claim 1, wherein said hydrogel polymer has a size of less than 150 mm when the maximum temperature is reached.

10. A method according to claim 1, wherein said polymerization system is retained at a temperature in the range of 50–85° C. for at least 5 minutes after said polymerization system has reached said maximum temperature.

11. A method according to claim 1, wherein said aqueous polymerizable monomer solution comprises acrylic acid and/or an alkali metal salt, an ammonium salt or an amine salt thereof, and a first cross-linking agent possessed of at least two polymerizing unsaturated double bonds per molecule as main components thereof.

12. A method according to claim 11, wherein the concentration of said water-soluble ethylenically unsaturated monomer in said aqueous polymerizable monomer solution is in the range of 10–80% by weight.

13. A method according to claim 12, wherein the amount of said first cross-linking agent is in the range of 0.001–20% by weight, based on the amount of said water-soluble ethylenically unsaturated monomer.

14. A method for the production of an absorbent resin, which comprises drying and pulverizing the cross-linked polymer obtained by the method of claim 1, thereby producing cross-linked polymer particles, mixing said cross-linked polymer particles with a second cross-linking agent capable of reacting with at least two functional groups in the proximity of the surface of said cross-linked polymer particles, and subjecting the resultant mixture to a heat treatment.

15. A method according to claim 14, wherein the amount of said second cross-linking agent is in the range of 0.001–10% by weight, based on the amount of the solids of said cross-linked polymer.

16. A method according to claim 15, wherein water or a hydrophilic organic solvent is used as a solvent during the mixture of said cross-linked polymer with said second cross-linking agent.

17. A method according to claim 14, wherein said heat treatment is carried out at a temperature in the range of 50–250° C.

* * * * *